United States Patent
Lee et al.

(10) Patent No.: US 12,468,452 B2
(45) Date of Patent: Nov. 11, 2025

(54) STORAGE DEVICE INCLUDING NONVOLATILE MEMORY DEVICE AND CONTROLLER

(71) Applicant: Samsung Electronics Co., Ltd., Suwon-si (KR)

(72) Inventors: Changjun Lee, Suwon-si (KR); Dayeon Kim, Suwon-si (KR); Sangwoo Kim, Suwon-si (KR); Yongjun Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/370,564

(22) Filed: Sep. 20, 2023

(65) Prior Publication Data

US 2024/0241648 A1 Jul. 18, 2024

(30) Foreign Application Priority Data

Jan. 18, 2023 (KR) ........................ 10-2023-0007537

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC .... G06F 3/0619; G06F 3/0659; G06F 3/0679; G06F 3/0614; G06F 3/0658; G06F 11/1044; G06F 2212/202; G11C 29/52
See application file for complete search history.

(56) References Cited

U.S. PATENT DOCUMENTS

| | | |
|---|---|---|
| 2018/0129563 A1 | 5/2018 | Kim et al. |
| 2019/0286351 A1* | 9/2019 | Ho .................. G06F 3/0656 |
| 2020/0334138 A1* | 10/2020 | Byun .............. G06F 12/0246 |
| 2020/0387445 A1 | 12/2020 | Byun |
| 2021/0365569 A1 | 11/2021 | Chen |
| 2022/0004489 A1 | 1/2022 | Cariello |
| 2022/0012174 A1 | 1/2022 | Seok |

(Continued)

FOREIGN PATENT DOCUMENTS

| | | | | |
|---|---|---|---|---|
| CN | 110413228 A | * | 11/2019 | ......... G06F 12/0877 |
| KR | 10-2020-0133817 A | | 11/2020 | |

(Continued)

*Primary Examiner* — Masud K Khan
(74) *Attorney, Agent, or Firm* — Sughrue Mion, PLLC

(57) ABSTRACT

There is provided a storage device which includes a nonvolatile memory device that includes a first area and a second area, and a controller that receives a first command from an external host device, generates a physical address by performing first error correction decoding on a physical address entry included in the first command, reads first data from the second area of the nonvolatile memory device by using the physical address, and outputs the first data to the external host device. When the first error correction decoding fails, the controller reads first map data from the first area from the nonvolatile memory device, translates a logical address included in the first command into the physical address by using the first map data, reads the first data from the second area of the nonvolatile memory device by using the physical address, and outputs the first data to the external host device.

18 Claims, 12 Drawing Sheets

(56) References Cited

U.S. PATENT DOCUMENTS

| | | | |
|---|---|---|---|
| 2022/0012181 A1 | 1/2022 | Gim | |
| 2022/0050741 A1* | 2/2022 | Lee | G06F 11/1004 |
| 2022/0113877 A1 | 4/2022 | Kim et al. | |
| 2022/0197509 A1 | 6/2022 | Kim | |
| 2023/0376243 A1* | 11/2023 | Basu | G06F 3/0659 |

FOREIGN PATENT DOCUMENTS

| | | |
|---|---|---|
| KR | 10-2020-0139433 A | 12/2020 |
| KR | 10-2022-0006913 A | 1/2022 |
| KR | 10-2022-0007300 A | 1/2022 |
| KR | 10-2022-0021186 A | 2/2022 |
| KR | 10-2022-0049215 A | 4/2022 |
| KR | 10-2022-0090020 A | 6/2022 |

* cited by examiner

FIG. 4

| SIG | PAR2 | PPN |
|---|---|---|
| SIG | PAR2 | PPN |
| SIG | PAR2 | PPN |
| SIG | PAR2 | PPN |
| ⋮ | ⋮ | ⋮ |
| SIG | PAR2 | PPN |

PAE

FIG. 5

| LA | WP |
|---|---|
| LA | WP |
| LA | WP |
| LA | WP |
| ⋮ | ⋮ |
| LA | WP |

ML

STORAGE DEVICE INCLUDING NONVOLATILE MEMORY DEVICE AND CONTROLLER

CROSS-REFERENCE TO RELATED APPLICATIONS

This application is based on and claims priority under 35 U.S.C. § 119 to Korean Patent Application No. 10-2023-0007537 filed on Jan. 18, 2023, in the Korean Intellectual Property Office, the disclosures of which are incorporated by reference herein in their entireties.

BACKGROUND

1. Field

Embodiments of the disclosure relate to an electronic device, and more particularly, relate to a storage device with improved operating speed.

2. Description of Related Art

A storage device stores data under control of a host device, such as a computer, a smartphone, or a smart pad. The storage device may include a first type of device, which stores data on a magnetic disk, such as a hard disk drive (HDD), or a second type of device, which stores data in a semiconductor memory, in particular, a nonvolatile memory, such as a solid state drive (SSD) or a memory card.

The nonvolatile memory includes a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), etc.

Recently, the operating speed of the host device, which communicates with the storage device, such as a computer, a smart phone, or a smart pad is improved as semiconductor manufacturing technologies develop. Moreover, the size of content stored in the storage device and accessed by the host device of the storage device is increasing. As such, the storage device with improved operating speed is being continuously required.

SUMMARY

Embodiments of the disclosure provide a storage device with improved operating speed.

According to an aspect of the disclosure, there is provided a storage device including: a nonvolatile memory device including a first area and a second area; and a controller configured to: receive a first command from a host device, perform first error correction decoding on a physical address entry in the first command; based on a success of the first error correction decoding: generate a physical address based on the first error correction decoding, read first data from the second area of the nonvolatile memory device based on the physical address, and output the first data to the host device, and based on a failure of the first error correction decoding: read first map data from the first area in the nonvolatile memory device, translate a logical address in the first command into the physical address based on the first map data, read the first data from the second area of the nonvolatile memory device based on the physical address, and output the first data to the host device.

According to another aspect of the disclosure, there is provided a storage device including: a nonvolatile memory device including a first area and a second area; and a controller configured to: receive a first command from a host device, read first physical addresses from the first area in the nonvolatile memory device based on the first command, generate second physical addresses and first parities by performing the first error correction encoding on the first physical addresses, and transmit physical address entries including the second physical addresses and the first parities to the host device.

According to another aspect of the disclosure, there is provided a storage device including: a nonvolatile memory device including a first area and a second area; and a controller configured to: receive a first command from a host device, read first physical addresses and first parities from the first area in the nonvolatile memory device, generate second physical addresses by performing first error correction decoding and first decryption on the first physical addresses and the first parities, generate third physical addresses and second parities by performing first encryption and first error correction encoding on the second physical addresses, transmit physical address entries including the third physical addresses and the second parities to the host device, and receive a second command including a physical address entry, perform second error correction decoding on the physical address entry in the second command, based on a success of the second error correction decoding: generate a fourth physical address by performing second error correction decoding and second decryption on the physical address entry in the second command; read first data and a third parity from the second area in the nonvolatile memory device based on the fourth physical address; generate second data by performing third error correction decoding and third decryption on the first data and the third parity; and output the second data to the host device, and based on a failure of the second error correction decoding: read first map data and a fourth parity from the first area in the nonvolatile memory device; generate second map data by performing fourth error correction decoding and fourth decryption on the first map data and the fourth parity; translate a logical address included in the second command into the fourth physical address based on the second map data; read the first data and the third parity from the second area in the nonvolatile memory device based on the fourth physical address; generate the second data by performing the third error correction decoding and the third decryption on the first data and the third parity; and output the second data to the host device.

BRIEF DESCRIPTION OF DRAWINGS

The above and other objects and features of the disclosure will become apparent by describing in detail embodiments thereof with reference to the accompanying drawings.

FIG. 4 illustrates an example of physical address entries.

FIG. 5 illustrates an example of a map list.

DETAILED DESCRIPTION

Below, embodiments of the disclosure will be described in detail and clearly to such an extent that an ordinary one in the art easily implements the disclosure.

Figure 1:
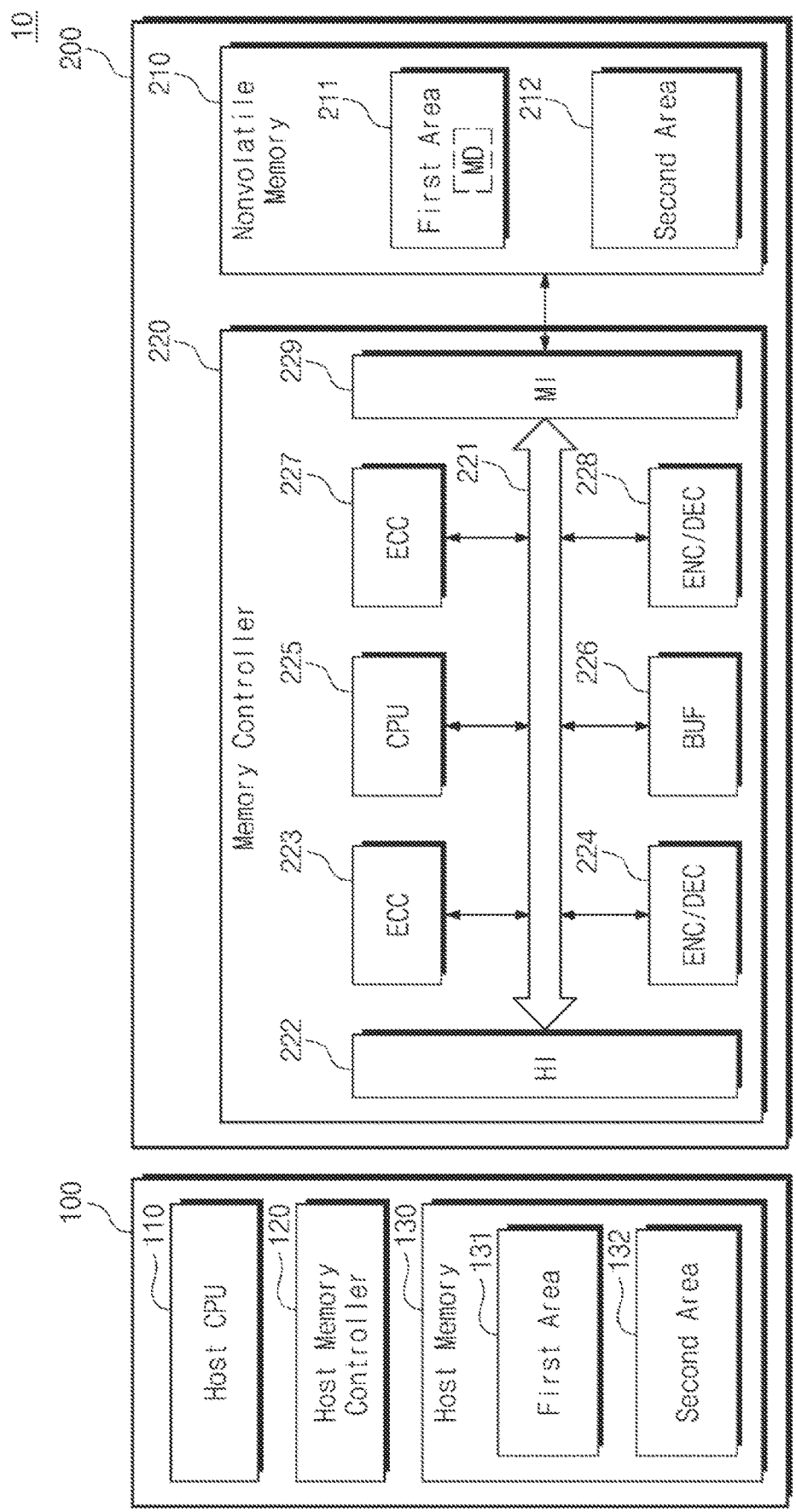
FIG. 1 is a diagram illustrating an electronic device according to an embodiment of the disclosure.

FIG. 1 is a diagram illustrating an electronic device 10 according to an embodiment of the disclosure. Referring to FIG. 1, the electronic device 10 may include a host device 100 and a storage device 200.

The host device 100 may write data in to the storage device 200 or may read the stored data from the storage device 200. The host device 100 may include a host Central Processing Unit (CPU) 110, a host memory controller 120, and a host memory 130.

The host CPU 110 may include a CPU or an Application Processor (AP). The host CPU 110 may include various auxiliary processors such as a Graphic Processing Unit (GPU)), a Neural Processing Unit (NPU), a Digital Signal Processor (DSP), and an Image Signal Processor (ISP). The CPU, the AP, and the auxiliary processors may be provided in the form of an independent core. However, the disclosure is not limited thereto, as such, according to an embodiment, the host CPU 110 may be implemented in other manner. For example, host CPU 110 may be implemented as a single core processor or a multi-core processor.

The host CPU 110 may drive an operating system and may execute various applications on the operating system. The host CPU 110 may control various components of the electronic device 10 and/or the storage device 200. For example, the host CPU 110 may control various components of the electronic device 10 and/or the storage device 200 through the operating system.

The host memory controller 120 may access the host memory 130 under control of the host CPU 110. For example, the host memory controller 120 may communicate with the host memory 130 based on one of various standards including DDR (Double Data Rate) DRAM (Dynamic Random Access Memory).

The host memory 130 may be used as a main memory, a system memory, or a working memory in the host device 100. The host memory 130 may be implemented based on one of various standards including DDR DRAM.

The host CPU 110 may divide and use a storage space of the host memory 130 into a first host memory area 131 and a second host memory area 132. The host CPU 110 may store data necessary for accessing the storage device 200 in the first host memory area 131. For example, the host CPU 110 may load the data necessary for accessing the storage device 200 to the first host memory area 131. The host CPU 110 may store user data, codes of the operating system and the applications read from the storage device 200, and/or user data generated by the operating system or the applications in the second host memory area 132. For example, the host CPU 110 may load the user data, the codes of the operating system and the applications read from the storage device 200, and/or the user data generated by the operating system or the applications to the second host memory area 132.

In an embodiment, the host CPU 110 and the host memory controller 120 may be implemented with one semiconductor package. The host memory 130 may be implemented with a separate semiconductor package.

To convey embodiments of the disclosure clearly, the host CPU 110, the host memory controller 120, and the host memory 130 of the host device 100 are illustrated in FIG. 1. However, it may be understood that the host device 100 may include various additional components, for example, which will be described with reference to FIG. 14.

Depending on a request (or a command) of the host device 100, the storage device 200 may write various data and may retain the written data permanently without a power. Depending on a request (or a command) of the host device 100, the storage device 200 may read various data and may provide the read data to the host device 100.

The storage device 200 may include a nonvolatile memory device 210 and a memory controller 220. The nonvolatile memory device 210 may be implemented with one of various nonvolatile memory devices such as a flash memory device, a ferroelectric memory device, a phase-change memory device, a magnetic memory device, and a resistive memory device.

Depending on a request (or a command) of the host device 100, the memory controller 220 may write data in the nonvolatile memory device 210 or may read data from the nonvolatile memory device 210. Depending on an internal policy, the memory controller 220 may perform various background operations for managing physical features of the nonvolatile memory device 210 or data written in the nonvolatile memory device 210.

The memory controller 220 may include a bus 221, a host interface (HI) 222, a first error correction module (ECC) 223, a first encryption and decryption module (ENC/DEC) 224, a CPU 225, an internal buffer (BUF) 226, a second error correction module 227, a second encryption and decryption module (ENC/DEC) 228, and a memory interface (MI) 229.

The bus 221 may provide communication channels between the components of the memory controller 220.

The host interface 222 may provide an interface communicating with the host device 100. For example, the host interface 222 may communicate with the host device 100 based on one of various storage interfaces such as UFS (Universal Flash Storage), PCIe (Peripheral Component express), and NVMe (Nonvolatile Memory express). The host interface 222 may provide various commands transferred from the host device 100 to the CPU 225. The host interface 222 may receive data from the host device 100. The host interface 222 may transmit data to the host device 100. The host interface 222 may transmit responses generated by the CPU 225 to the host device 100.

The first error correction module 223 may perform error correction encoding and error correction decoding. The first encryption and decryption module 224 may perform encryption and decryption. For example, the first error correction module 223 and the first encryption and decryption module 224 may perform encryption on partial data among data to be transmitted to the host device 100, for example, addresses and may generate parities by performing error correction encoding. The encrypted partial data and the parities may be transmitted to the host device 100 through the host interface 222. The first error correction module 223 and the first encryption and decryption module 224 may perform error correction and decryption by performing error correction decoding and decryption on a portion of data received from the host device 100, for example, an encrypted address received together with a parity in a state of being included in the command.

The CPU 225 may manage commands received from the host device 100 and may generate commands to be transmitted to the nonvolatile memory device 210 based on the command received from the host device 100. The CPU 225 may perform various background operations for managing the storage device 200 depending on the internal policy. The CPU 225 may execute firmware for managing the storage device 200.

The internal buffer 226 may be used as a working memory of the CPU 225. The internal buffer 226 may be used as a system memory that stores meta data for managing the storage device 200. The internal buffer 226 may be used to buffer data that are exchanged between the host interface 222 and the memory interface 229. For example, the internal buffer 226 may be implemented with an SRAM (Static Random Access Memory) or a DRAM.

The second error correction module 227 may perform error correction encoding and error correction decoding. The second encryption and decryption module 228 may perform encryption and decryption. For example, the second error correction module 227 and the second encryption and decryption module 228 may sequentially perform error correction encoding and encryption on data to be transmitted to the nonvolatile memory device 210. The encrypted data and parities may be transmitted to the nonvolatile memory device 210 through the memory interface 229. The second error correction module 227 and the second encryption and decryption module 228 may sequentially perform error correction decoding and decryption on data received from the nonvolatile memory device 210.

The memory interface 229 may provide an interface communicating with the nonvolatile memory device 210. For example, the memory interface 229 may communicate with the nonvolatile memory device 210 based on one of various nonvolatile memory interfaces such as an ONFI (Open NAND Flash Interface) and a toggle NAND interface. The memory interface 229 may transmit various commands provided from the CPU 225 to the nonvolatile memory device 210. The memory interface 229 may exchange data with the nonvolatile memory device 210.

In an embodiment, the first error correction module 223 and the second error correction module 227 may use the same error correction algorithm or different error correction algorithms. The error correction unit of the first error correction module 223 may be different from the error correction unit of the second error correction module 227. The error correction unit of the first error correction module 223 may be smaller than the error correction unit of the second error correction module 227. For example, the first error correction module 223 may perform error correction in units of one physical address of map data MD (e.g., in units of 4 bytes). The second error correction module 227 may perform error correction in units of one logical page of the nonvolatile memory device 210 (e.g., in units of 4 KB) or in units of segment included in one logical page (e.g., 1 KB).

In an embodiment, the first encryption and decryption module 224 and the second encryption and decryption module 228 may use the same encryption and decryption algorithm or different encryption and decryption algorithms.

The encryption and decryption unit of the first encryption and decryption module 224 may be different from the encryption and decryption unit of the second encryption and decryption module 228. The encryption and decryption unit of the first encryption and decryption module 224 may be smaller than the encryption and decryption unit of the second encryption and decryption module 228. For example, the first encryption and decryption module 224 may perform encryption and decryption in units of one physical address of the map data MD (e.g., in units of 4 bytes). The second encryption and decryption module 228 may perform encryption and decryption in units of one logical page of the nonvolatile memory device 210 (e.g., in units of 4 KB) or in units of segment included in one logical page (e.g., 1 KB).

The memory controller 220 may manage a storage space of the nonvolatile memory device 210 by using a first area 211 and a second area 212. Memory cells of the first area 211 may be used as SLC (Single Level Cell) memory cells. Memory cells of the second area 212 may be used as MLC (Multi Level Cell) memory cells, TLC (Triple Level Cell) memory cells, or higher-level memory cells.

In an embodiment, the memory controller 220 may use the first area 211 as a meta memory for storing the meta data. For example, the memory controller 220 may store the map data MD among the meta data in the first area 211, and the map data MD may include mapping information between logical addresses of the host device 100 and physical addresses of the nonvolatile memory device 210.

The memory controller 220 may use the second area 212 as a user memory that stores user data transmitted from the host device 100.

In addition to the first area 211 and the second area 212, the nonvolatile memory device 210 may include at least one of various areas such as a reserved area used for the memory controller 220 to manage the storage device 200 and an overprovisioning area use for the memory controller 220 to improve the performance of the storage device 200.

In an embodiment, the memory controller 220 may be implemented with one semiconductor package. The capacity of the internal buffer 226 that is provided in one semiconductor package together with any other components may be restricted. Also, the internal buffer 226 may be used for various purposes such as an operation of the CPU 225, storing of meta data, and buffering of data exchanged with the host device 100.

As the capacity of the nonvolatile memory device 210 increases, the capacity of the map data MD may also increase; in this case, the memory controller 220 may fail to load the entire map data MD to the internal buffer 226. When necessary map data are absent from the internal buffer 226, the memory controller 220 may read the necessary map data from the original map data MD stored in the first area 211 of the nonvolatile memory device 210. When a free capacity of the internal buffer 226 is insufficient, at least a portion of the map data previously stored in the internal buffer 226 may be discarded.

That is, a speed of a read service that the storage device 200 provides to the host device 100 may change depending on whether map data of read-requested data are present in the internal buffer 226 (e.g., a hit occurs) or are absent from the internal buffer 226 (e.g., a miss occurs).

To solve the above issue, the host device 100 may use the first host memory area 131 of the host memory 130 to store some or all of physical addresses of the map data MD. The host device 100 may accelerate the read service speed of the storage device 200 by transmitting a physical address of necessary data to the storage device 200 together with a read command. The acceleration function is called a host performance booster (HPB), but the disclosure is not limited thereto.

Figure 2:
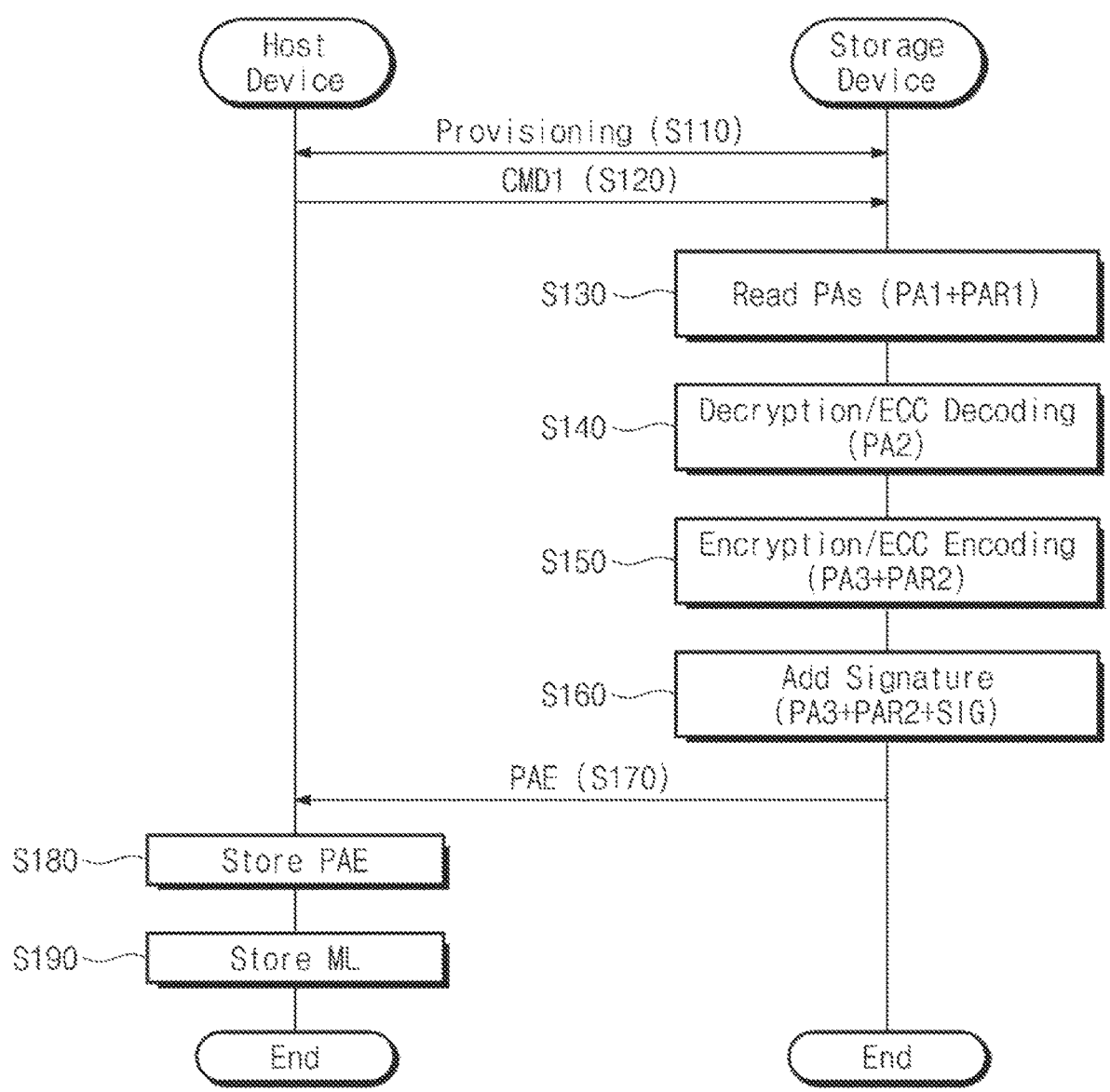
FIG. 2 illustrates an example of a process in which a storage device uploads physical addresses to a host device.

FIG. 2 illustrates an example of a process in which the storage device 200 uploads physical addresses to the host device 100. Referring to FIGS. 1 and 2, in operation S110, the host device 100 and the storage device 200 may perform provisioning. Here, provisioning may be referred to as provisioning operation. For example, in the provisioning operation, the host device 100 and the storage device 200 may exchange various information and may set various parameters.

For example, the storage device 200 may transmit, to the host device 100, information indicating whether the storage device 200 supports a host performance booster (HPB). The storage device 200 may receive, from the host device 100, information indicating whether to activate the HPB. In an embodiment, the HPB may be activated in the provisioning operation.

In operation S120, the host device 100 may transmit a first command CMD1 to the storage device 200. The first command CMD1 may be a command for requiring the upload of physical addresses. For example, the first command CMD1 may be a map data read command. For example, the host device 100 may include a range of physical addresses to be uploaded in the first command CMD1. According to an embodiment, the range of physical addresses to be uploaded in the first command CMD1 may be in the form of logical addresses. For example, the range of physical addresses to be uploaded may be included in a location of logical addresses within a command packet of the first command CMD1.

Figure 3:
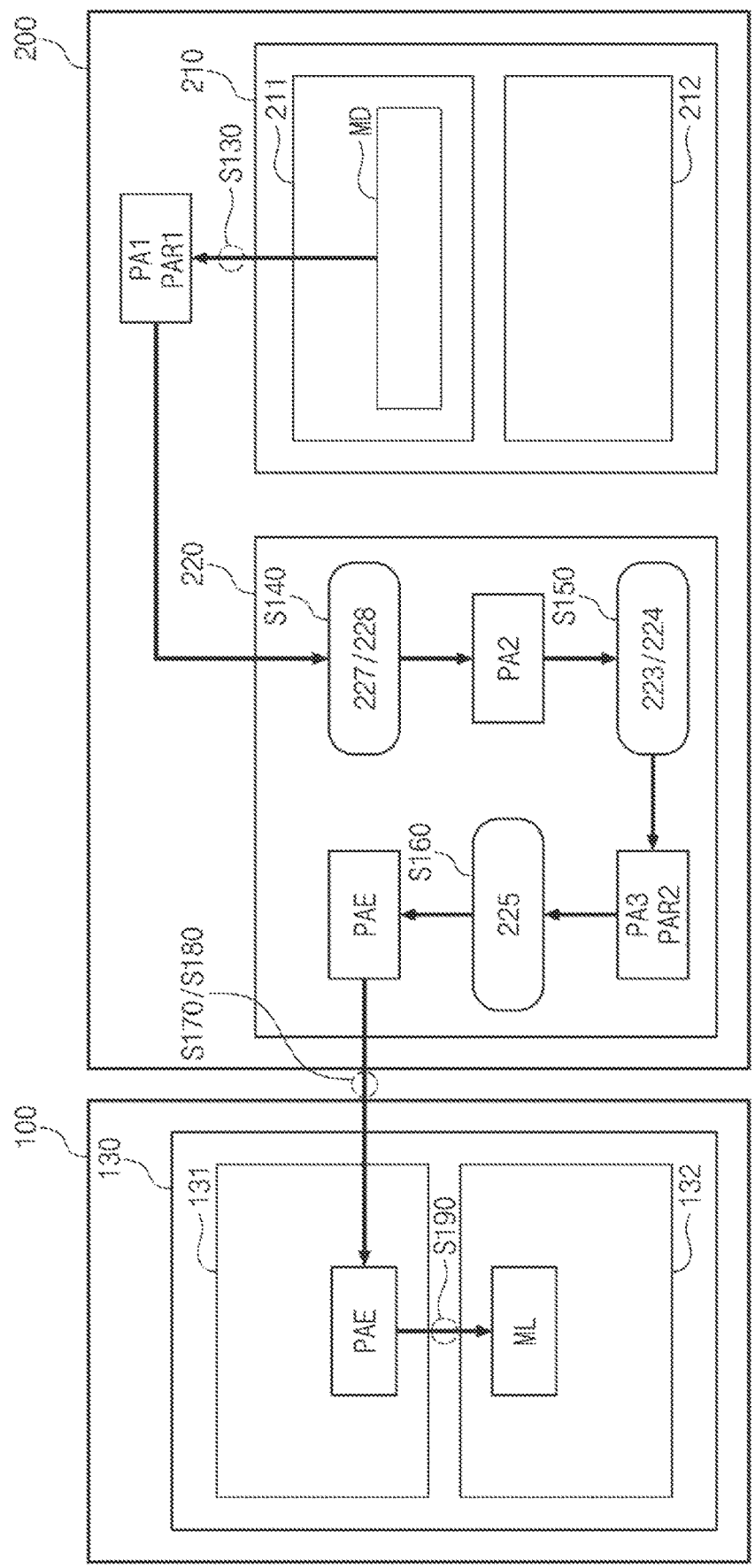
FIG. 3 illustrates an example of an upload operation of FIG. 2 performed in a host device and a storage device.

FIG. 3 illustrates an upload operation of FIG. 2 performed in the host device 100 and the storage device 200 according to an embodiment. Referring to FIGS. 2 and 3, in operation S130, the memory controller 220 may read physical addresses PAs. For example, the memory controller 220 may read the physical addresses PAs from the map data MD in the first area 211 of the nonvolatile memory device 210. The physical addresses PAs may be some or all of physical addresses included in the map data MD. The physical addresses PAs may include first physical addresses PA1 and first parities PAR1. The first physical addresses PA1 may be in a state of being encrypted by the second encryption and decryption module 228.

In operation S140, the memory controller 220 may perform decryption and error correction decoding. For example, the first physical addresses PA1 and the first parities PAR1 read from the nonvolatile memory device 210 may be transferred to the second error correction module 227 and the second encryption and decryption module 228. For example, the first physical addresses PA1 and the first parities PAR1 may be sequentially transferred to the second error correction module 227 and the second encryption and decryption module 228. The second error correction module 227 and the second encryption and decryption module 228 may generate second physical addresses PA2 by performing error correction decoding and decryption on the first physical addresses PA1 and the first parities PAR1. For example, the second physical addresses PA2 may be generated by sequentially performing error correction decoding and decryption on the first physical addresses PA1 and the first parities PAR1.

In operation S150, the memory controller 220 may perform encryption and error correction encoding. For example, the second physical addresses PA2 may be transferred to the first encryption and decryption module 224 and the first error correction module 223. For example, the second physical addresses PA2 may be sequentially transferred to the first encryption and decryption module 224 and the first error correction module 223. The first encryption and decryption module 224 and the first error correction module 223 may generate third physical addresses PA3 and second parities PAR2 by performing encryption and error correction encoding on the second physical addresses PA2. For example, the third physical addresses PA3 and second parities PAR2 may be generated by sequentially performing encryption and error correction encoding on the second physical addresses PA2.

In operation S160, the CPU 225 may add signatures SIG. For example, the CPU 225 may generate physical address entries PAE by adding the signatures SIG to the third physical addresses PA3 and the second parities PAR2. For example, the signatures SIG may include information of the memory controller 220. For example, the signatures SIG may include a portion of firmware version information, given data patterns or dummy data patterns. However, the disclosure is not limited thereto, and as such, the signatures SIG may include other information corresponding to the memory controller 220. In an embodiment, the timing when the CPU 225 adds the signatures SIG may be variable.

In operation S170, the memory controller 220 may transmit the physical address entries PAE to the host device 100. In operation S180, the host device 100 may store the physical address entries PAE. For example, the host device 100 may store the physical address entries PAE in the first host memory area 131 of the host memory 130.

In operation S190, the host device 100 may store a map list ML. For example, the host device 100 may generate the map list ML and may store the map list ML in the second host memory area 132 of the host memory 130. The map list ML may include logical addresses to be transmitted to the storage device 200 by using the first command CMD1 and write pointers indicating locations of the first host memory area 131, at which the physical address entries PAE corresponding to the logical addresses are stored. However, the disclosure is not limited thereto, and as such, according to another embodiment, the host device 100 may store the map list ML in the first host memory area 131, instead of the second host memory area 132.

FIG. 4 illustrates an example of the physical address entries PAE. In an embodiment, each of the physical address entries PAE may have a capacity of 8 bytes. For example, each entry in the physical address entries PAE may include a third physical address (PA3), a second parity (PAR2) and a signature (SIG) associated with each other. Each of the third physical addresses PA3 may have a capacity of 4 bytes. For example, each of the third physical addresses may be physical page numbers PPN. Each of the second parities PAR2 may have a capacity of one byte. Each of the signatures SIG may have a capacity of 3 bytes. However, the disclosure is not limited thereto, and as such, according to another embodiment, the capacity of the physical address entries PAE may be different than 8 bytes, and the capacities of the third physical addresses PA3, the second parities PAR2 and the signatures SIG may be different.

FIG. 5 illustrates an example of the map list ML. Referring to FIG. 5, the map list ML may include logical addresses LA and write pointers WP. The logical addresses LA may correspond to the third physical addresses PA3 of the physical address entries PAE that the host device 100 stores in the first host memory area 131. The write pointer WP may indicate a location (or an order) in the first host memory area 131 where the physical address entries PAE are stored.

Figure 6:
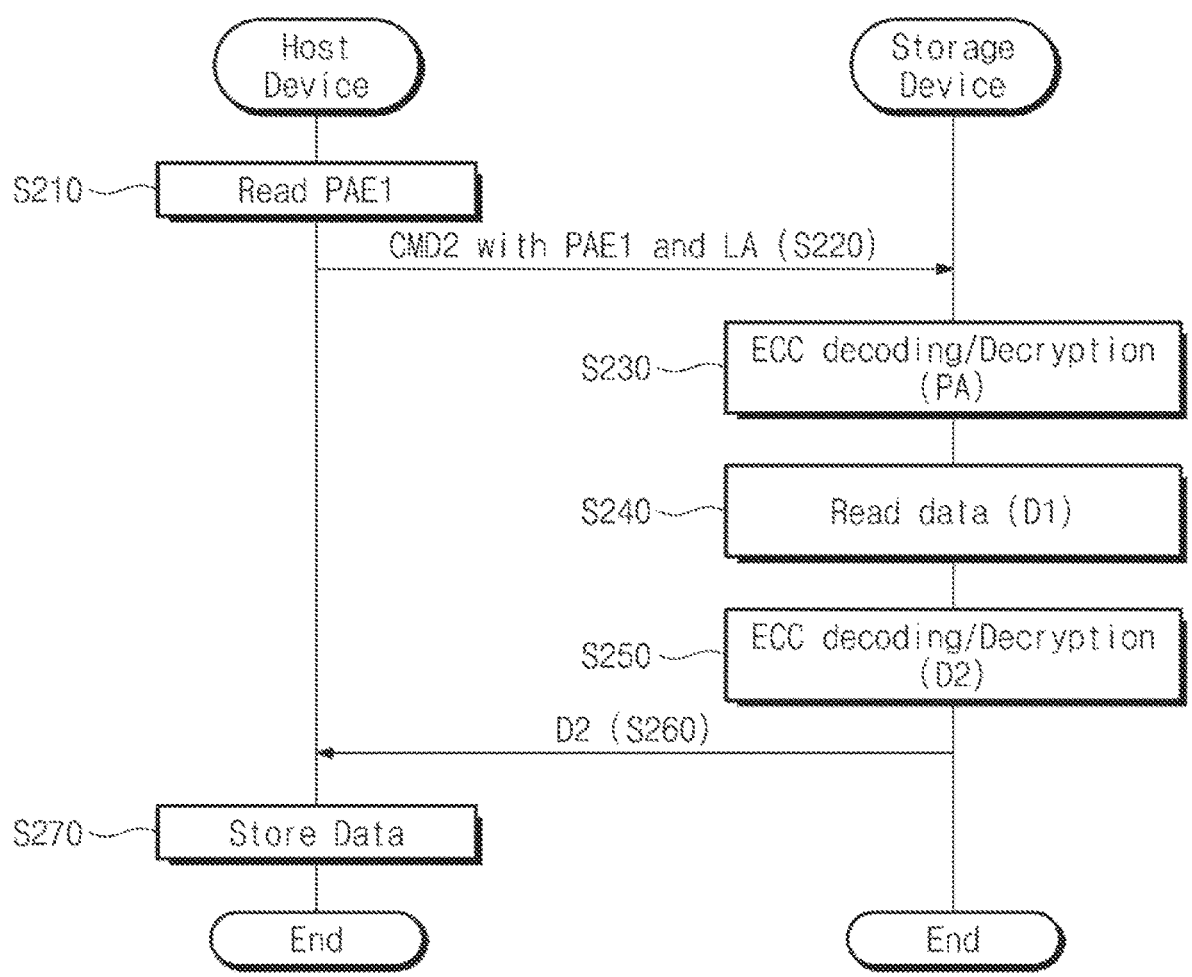
FIG. 6 illustrates a first example in which a host device and a storage device perform a read operation.
Figure 7:
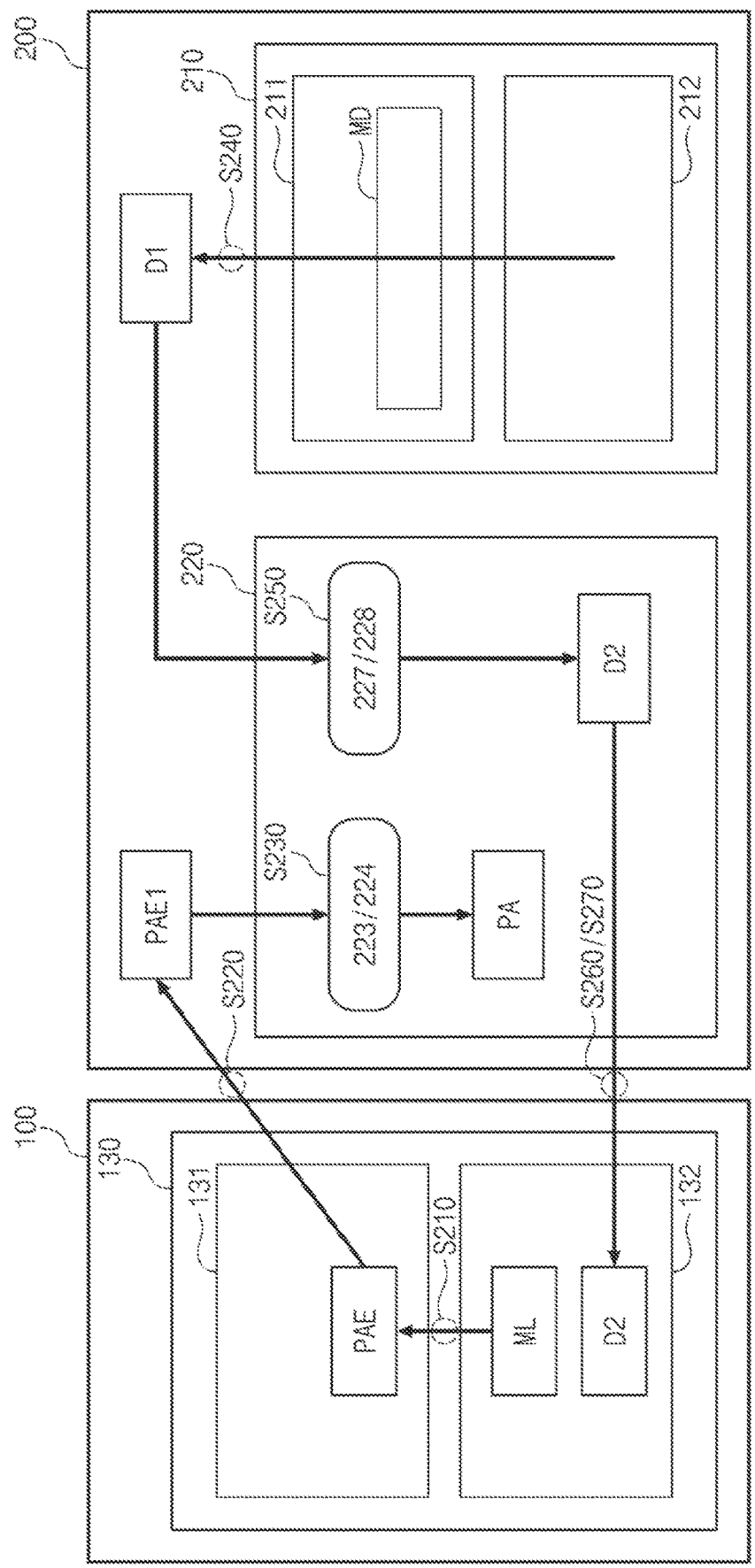
FIG. 7 illustrates an example of a read operation of FIG. 6 performed in a host device and a storage device.

FIG. 6 illustrates a first example in which the host device 100 and the storage device 200 perform a read operation. FIG. 7 illustrates an example of a read operation of FIG. 6, which is performed in the host device 100 and the storage device 200.

Referring to FIGS. 6 and 7, in operation S210, the host device 100 may read a first physical address entry PAE1. For example, the host device 100 may read the first physical address entry PAE1 corresponding to data to be read from the storage device 200 from the physical address entries PAE of the first host memory area 131 of the host memory 130.

In operation S220, the host device 100 may transmit a second command CMD2 to the storage device 200 together with the first physical address entry PAE1 and the logical address LA. The second command CMD2 may request the storage device 200 to perform the read operation by using the first physical address entry PAE1. For example, the second command CMD2 may be an HPB read command. The logical address LA may correspond to the first physical address entry PAE1. That is, the logical address LA may be a logical address LA of data that the host device 100 intends to read from the storage device 200.

In operation S230, the storage device 200 may perform error correction decoding and decryption. For example, a physical address and a parity included in the first physical address entry PAE1 received from the host device 100 may be transferred to the first error correction module 223 and the first encryption and decryption module 224. For example, the physical address and the parity may be sequentially transferred to the first error correction module 223 and the first encryption and decryption module 224. The first error correction module 223 and the first encryption and decryption module 224 may generate the physical address PA by performing error correction decoding and decryption on the physical address and the parity included in the first physical address entry PAE1. The physical address PA may be generated by sequentially performing error correction decoding and decryption on the physical address and the parity included in the first physical address entry PAE1.

Figure 8:
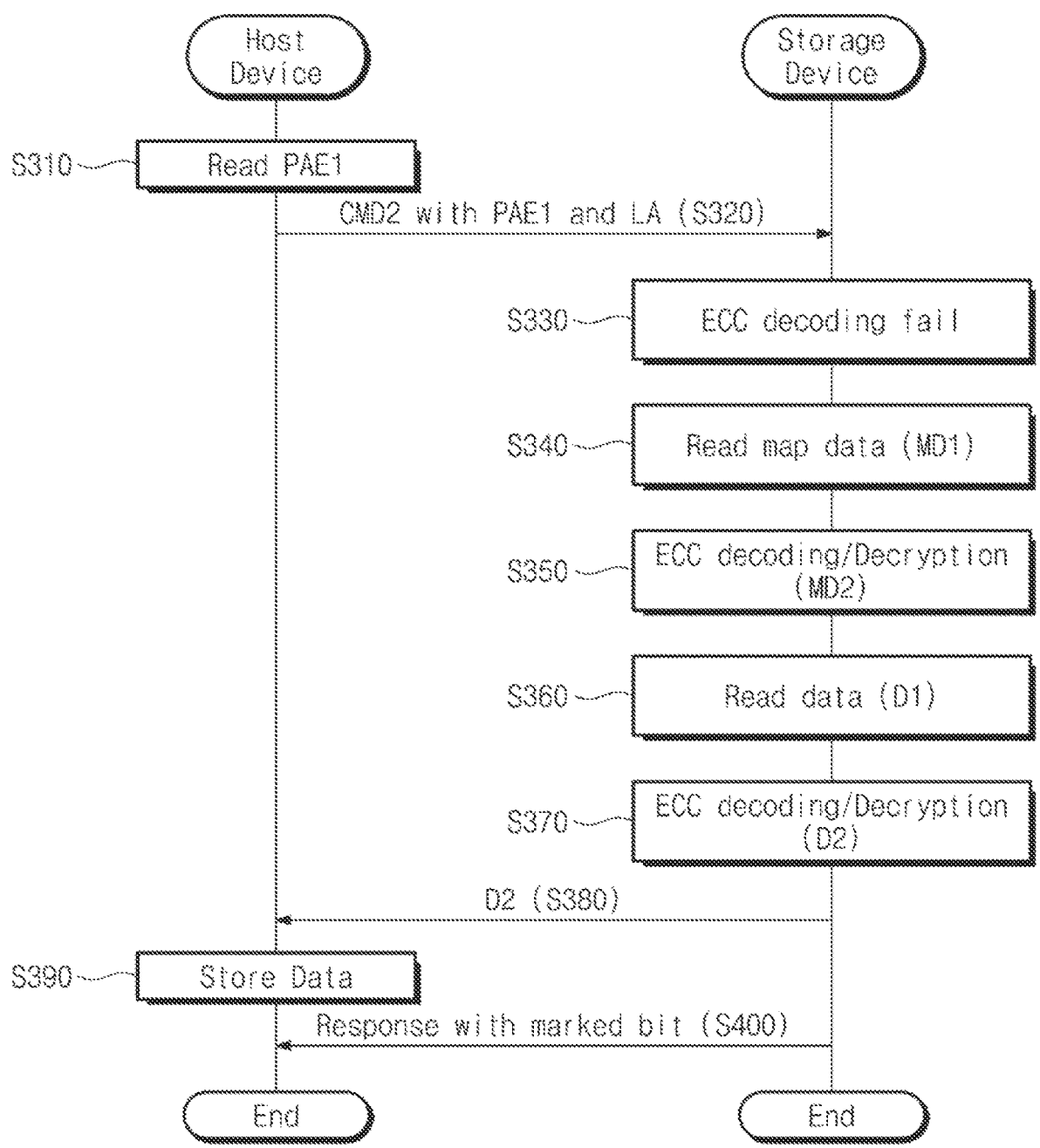
FIG. 8 illustrates a second example in which a host device and a storage device perform a read operation.
Figure 9:
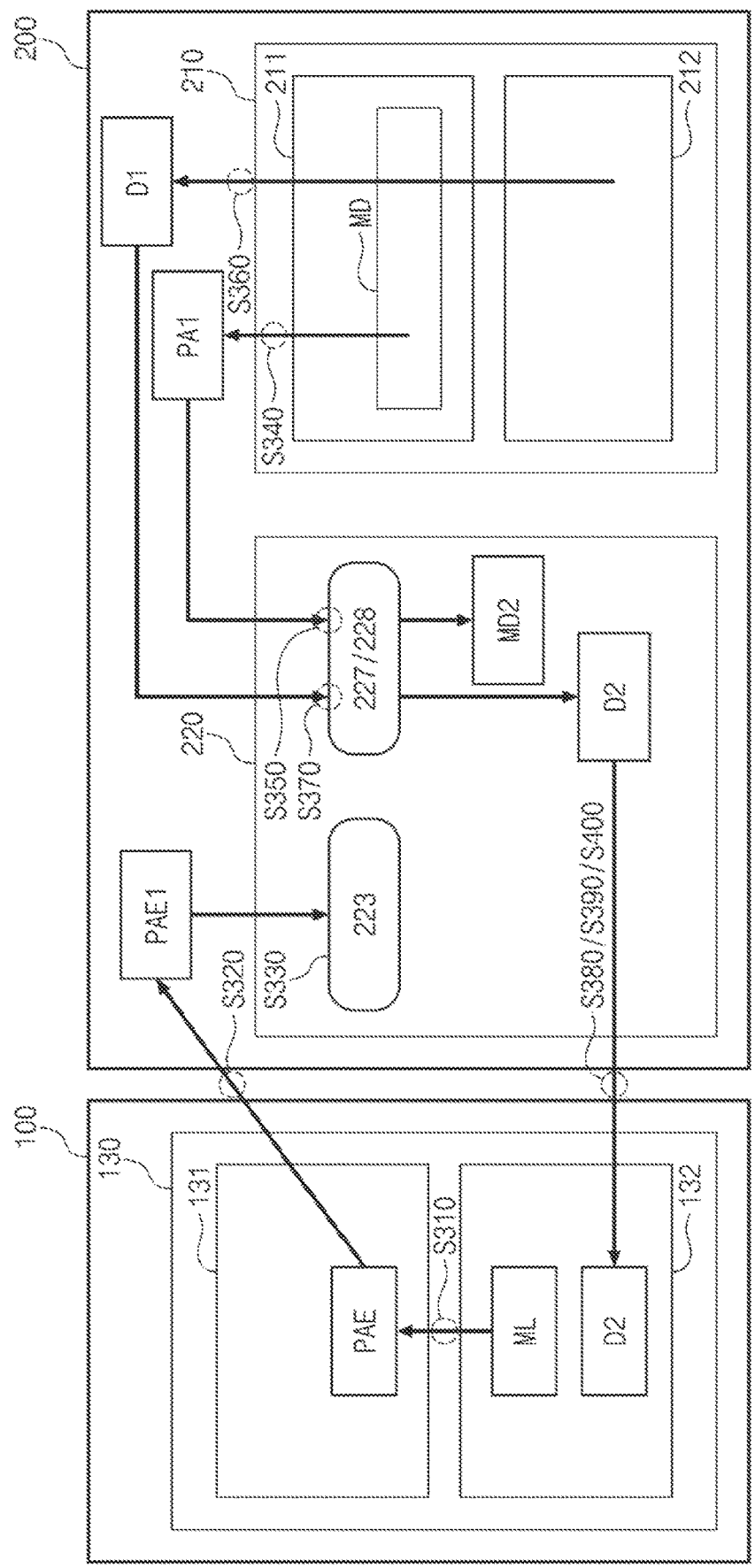
FIG. 9 illustrates an example of a read operation of FIG. 8 performed in a host device and a storage device.

In an embodiment, in a case when the error correction decoding succeeds, the CPU 225 may verify validity of the first physical address entry PAE1 by using the signature SIG included in the first physical address entry PAE1. According to an embodiment, a case when the error correction decoding fails is illustrated in FIGS. 8 and 9. When the signature SIG included in the first physical address entry PAE1 coincides with the signature added in operation S160 of FIGS. 2 and 3, the CPU 225 may identify that the first physical address entry PAE1 is valid. When the signature SIG included in the first physical address entry PAE1 does not coincide with the signature added in operation S160 of FIGS. 2 and 3, the CPU 225 may identify that the first physical address entry PAE1 is invalid. For example, the CPU 225 may identify that the first physical address entry PAE1 is valid when the signature SIG included in the first physical address entry PAE1 matches the signature added in operation S160 of FIGS. 2 and 3. On the other hand, the CPU 225 may identify that the first physical address entry PAE1 is invalid when the signature SIG included in the first physical address entry PAE1 does not match the signature added in operation S160 of FIGS. 2 and 3. In an embodiment, the timing when the validity of the first physical address entry PAE1 is verified by using the signature may be variable.

In an embodiment, the CPU 225 may check a cache hit or a cache miss of the physical address PA. For example, after uploading the physical addresses PAs to the host device 100, the CPU 225 may store and manage information, which indicates whether the map data MD are updated. The information indicating whether the map data MD are updated may be stored in the internal buffer 226. For example, the CPU 225 may store a bitmap in the internal buffer 226. Each bit of the bitmap may correspond to a group of physical addresses PAs uploaded to the host device 100 (or one physical address). Each bit of the bitmap may have a value indicating a cache hit or a cache miss (e.g., a cache hit and a cache miss of a physical address on a CPU level). When map data of a physical address belonging to one group (or one physical address) are updated, the CPU 225 may mark a corresponding bit of the bitmap as a bit indicating a cache miss. In an embodiment, the physical address PA may be determined based on an occurrence of a cache hit.

In operation S240, the storage device 200 may read data. For example, without reading the map data MD from the nonvolatile memory device 210 and without checking whether a hit or miss of the map data occurs in the internal buffer 226, the memory controller 220 may read first data D1 from the second area 212 of the nonvolatile memory device 210 by using the physical address PA.

In operation S250, the storage device 200 may perform error correction decoding and decryption. For example, the first data D1 read from the nonvolatile memory device 210 may be transferred to the second error correction module 227 and the second encryption and decryption module 228. The second error correction module 227 and the second encryption and decryption module 228 may generate second data D2 by performing error correction decoding and decryption on the first data D1. For example, the first data D1 may be sequentially transferred to the second error correction module 227 and the second encryption and decryption module 228, and the second data D2 may be generated by sequentially performing error correction decoding and decryption on the first data D1.

In operation S260, the storage device 200 may transmit the second data D2 to the host device 100. In operation S270, the host device 100 may store data. For example, the host device 100 may store the second data D2 received from the storage device 200 in the second host memory area 132 of the host memory 130.

FIG. 8 illustrates a second example in which the host device 100 and the storage device 200 perform a read operation. FIG. 9 illustrates examples of a read operation of FIG. 8, which is performed in the host device 100 and the storage device 200. In an embodiment, the case where error correction of a physical address entry fails is illustrated in FIGS. 8 and 9.

Referring to FIGS. 8 and 9, in operation S310, the host device 100 may read the first physical address entry PAE1. For example, the host device 100 may read the first physical address entry PAE1 corresponding to data to be read from the storage device 200 from the physical address entries PAE of the first host memory area 131 of the host memory 130.

In operation S320, the host device 100 may transmit the second command CMD2 to the storage device 200 together with the first physical address entry PAE1 and the logical address LA. The second command CMD2 may request to perform the read operation by using the first physical address entry PAE1. For example, the second command CMD2 may be the HPB read command. The logical address LA may correspond to the first physical address entry PAE1.

In operation S330, the storage device 200 fails in error correction decoding. For example, the physical address and the parity included in the first physical address entry PAE1 received from the host device 100 may be transferred to the first error correction module 223. The first error correction module 223 may perform error correction decoding on the physical address and the parity included in the first physical address entry PAE1. The first error correction module 223 may fail in error correction decoding. According to an embodiment, it may be determined that there is a failure in error correction decoding when the error correction decoding fails to satisfy certain criteria. For example, the CPU 225 may identify that the error correction decoding has failed when a result of performing error correction decoding on the physical address and the parity does not satisfy a predetermined criteria. For example, the result of performing error correction decoding on the physical address and the parity fails to output a valid result. On the other hand, it may be determined that the error correction decoding is successful when the error correction decoding satisfies the predetermined criteria. For example, the result of performing error correction decoding on the physical address and the parity output a valid result. According to an embodiment, the error correction decoding on the physical address and the parity fails when the number of errors corrected in the error correction decoding is equal to or greater than a reference value. On the other hand, the error correction decoding on the physical address and the parity succeeds when the number of errors corrected in the error correction decoding is less than a reference value.

When the error correction decoding fails, the CPU 225 may skip the verification of validity of the signature SIG included in the first physical address entry PAE1. That is, the resource of the storage device 200 may be saved.

In an embodiment, the memory controller 220 may check whether map data corresponding to the logical address LA are present in the internal buffer 226 (e.g., a cache hit of map data in a memory controller level) or are absent from the internal buffer 226 (e.g., a cache miss of map data in a memory controller level). When it is determined that the map data corresponding to the logical address LA exists (i.e., a cache hit of map data in a memory controller level), the memory controller 220 may read data from the nonvolatile memory device 210 by using the map data of the internal buffer 226 (refer to operation S240 of FIG. 6). Afterwards, the storage device 200 and the host device 100 may perform operation S250, operation S260, and operation S270.

When it is determined that the map data corresponding to the logical address LA do not exist (i.e., a cache miss of map data in a memory controller level), the memory controller 220 may enter operation S340.

In operation S340, the storage device 200 may read map data. For example, the memory controller 220 may read first map data MD1 corresponding to the logical address LA included in the first physical address entry PAE1 from the map data MD of the first area 211 of the nonvolatile memory device 210.

In operation S350, the storage device 200 may perform error correction decoding and decryption. For example, the first map data MD1 read from the nonvolatile memory device 210 may be sequentially transferred to the second error correction module 227 and the second encryption and decryption module 228. The second error correction module 227 and the second encryption and decryption module 228 may generate second map data MD2 by sequentially performing error correction decoding and decryption on the first map data MD1.

In operation S360, the storage device 200 may read data. For example, the memory controller 220 may translate the logical address LA included in the second command CMD2 into a physical address by using the second map data MD2. The memory controller 220 may read the first data D1 from the second area 212 of the nonvolatile memory device 210 by using the translated physical address.

In operation S370, the storage device 200 may perform error correction decoding and decryption. For example, the first data D1 read from the nonvolatile memory device 210 may be transferred to the second error correction module 227 and the second encryption and decryption module 228. The second error correction module 227 and the second encryption and decryption module 228 may generate the second data D2 by performing error correction decoding and decryption on the first data D1. The first data D1 may be sequentially transferred to the second error correction module 227 and the second encryption and decryption module 228, and the second data D2 may be generated by sequentially performing error correction decoding and decryption on the first data D1.

In operation S380, the storage device 200 may transmit the second data D2 to the host device 100. In operation S390, the host device 100 may store data. For example, the host device 100 may store the second data D2 received from the storage device 200 in the second host memory area 132 of the host memory 130.

In operation S400, the storage device 200 may transmit a response including a marked bit to the host device 100. The marked bit may indicate that the error correction decoding fails. Alternatively, the marked bit may provide notification that the update of the physical address entries PAE is required.

In an embodiment, when the error correction of the first physical address entry PAE1 fails, it may be determined that an error occurs in the physical address entries PAE. For example, it may be determined that an error occurs in the host memory 130 or in the process where the host memory controller 120 reads data from the host memory 130. By transmitting the response including the marked bit to the host device 100, the storage device 200 may notify the host device 100 that an error occurs in the host memory 130 or the host memory controller 120.

After receiving the response including the marked bit, the host device 100 may perform various follow-up operations. For example, the host device 100 may perform remedial measures. According to an embodiment, the host device 100 may again load the physical address entries PAE to the host memory 130 by performing the operations described with reference to FIGS. 2 and 3. The physical address entries PAE again loaded to the host memory 130 may not have an error. For example, the host device 100 may refresh the physical address entries PAE.

As another example, the host device 100 may refresh the physical address entries PAE after performing training of the host memory 130. As another example, the host device 100 may deactivate the HPB.

Figure 10:
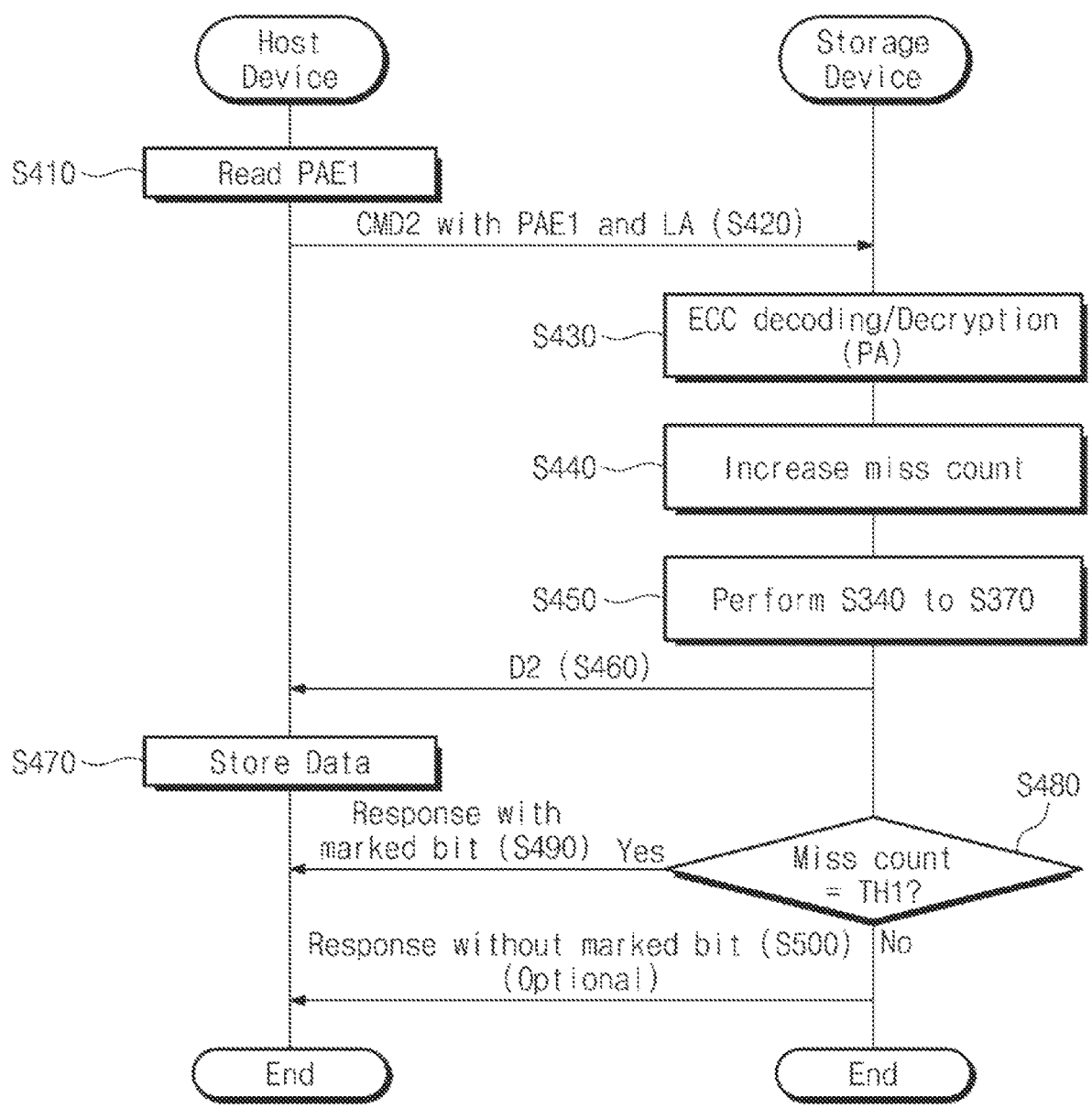
FIG. 10 illustrates a third example in which a host device and a storage device perform a read operation.

FIG. 10 illustrates a third example in which the host device 100 and the storage device 200 perform a read operation. In an embodiment, the case where a cache miss of a physical address occurs is illustrated in FIG. 10.

Referring to FIG. 10, in operation S410, the host device 100 may read the first physical address entry PAE1. For example, the host device 100 may read the first physical address entry PAE1 corresponding to data to be read from the storage device 200 from the physical address entries PAE of the first host memory area 131 of the host memory 130.

In operation S420, the host device 100 may transmit the second command CMD2 to the storage device 200 together with the first physical address entry PAE1 and the logical address LA. The second command CMD2 may request to perform the read operation by using the first physical address entry PAE1. For example, the second command CMD2 may be the HPB read command. The logical address LA may correspond to the first physical address entry PAE1.

In operation S430, the storage device 200 may perform error correction decoding and decryption. For example, the physical address and the parity included in the first physical address entry PAE1 received from the host device 100 may be transferred to the first error correction module 223 and the first encryption and decryption module 224. The first error correction module 223 and the first encryption and decryption module 224 may generate the physical address PA by performing error correction decoding and decryption on the physical address and the parity included in the first physical address entry PAE1. For example, the physical address and the parity may be sequentially transferred to the first error correction module 223 and the first encryption and decryption module 224, and the physical address PA may be generated by sequentially performing error correction decoding and decryption on the physical address and the parity included in the first physical address entry PAE1.

In an embodiment, when the error correction decoding succeeds, the CPU 225 may verify validity of the first physical address entry PAE1 by using the signature SIG included in the first physical address entry PAE1.

In an embodiment, the CPU 225 may check a cache hit or a cache miss of the physical address PA. In an embodiment, the memory controller 220 may determine the cache miss.

When the cache miss is determined, in operation S440, the storage device 200 may increase a miss count. The miss count may indicate the number of times that the cache miss occurs.

In an embodiment, when the cache miss occurs, the memory controller 220 may check whether map data corresponding to the logical address LA are present in the internal buffer 226 (e.g., hit) or are absent from the internal buffer 226 (e.g., miss). When it is determined that the map data corresponding to the logical address LA exists (i.e., hit), the memory controller 220 may read data from the nonvolatile memory device 210 by using the map data of the internal buffer 226 (refer to operation S240 of FIG. 6). Afterwards, the storage device 200 and the host device 100 may enter operation S460.

When it is determined that the map data corresponding to the logical address LA do not exist (i.e., miss), the memory controller 220 may enter operation S450.

In operation S450, the storage device 200 may perform operation S340 to operation S370 of FIGS. 8 and 9. For example, the memory controller 220 may read the map data from the nonvolatile memory device 210 and may read data (e.g., the second data D2) from the nonvolatile memory device 210 by using the read map data.

In operation S460, the storage device 200 may transmit the second data D2 to the host device 100. In operation S470, the host device 100 may store data. For example, the host device 100 may store the second data D2 received from the storage device 200 in the second host memory area 132 of the host memory 130.

In operation S480, the storage device 200 may determine that the miss count is equal to a first threshold value TH1. When the miss count reaches (or equals) the first threshold value TH1, in operation S490, the storage device 200 may transmit a response including a marked bit to the host device 100. The marked bit may indicate that the miss count has reached to the first threshold value TH1. Alternatively, the marked bit may provide notification that the update of the physical address entries PAE is required. The marked bit in operation S490 may be equal to or different from the marked bit in operation S400. For example, the location and/or the value of the "miss count" marked bit in operation S490 may be different from the location and/or the value of the "error decoding failure" marked bit in operation S400. After transmitting the response including the marked bit to the host device 100, the storage device 200 may initialize the miss count.

In an embodiment, the storage device 200 may increase the miss count when the cache miss occurs in each of the physical address entries PAE uploaded to the host device 100. The miss count may indicate how much the physical address entries PAE are incorrect and may be used as an index indicating the degree to which the refresh of the physical address entries PAE is required.

When the miss count does not reach the first threshold value TH1, in operation S500, the storage device 200 may transmit a response, which does not include a marked bit, (e.g., a normal response) to the host device 100. In an embodiment, to transmit the response, which does not include a marked bit, to the host device 100 may be optionally performed or may be skipped.

As described above, the storage device 200 according to an embodiment of the disclosure may perform error correction on a physical address entry received from the host device 100. Accordingly, even though the physical address entry received from the host device 100 is erroneous, when the number of errors is within an error correction range, the HPB may be normally performed. Accordingly, the number of times that map data are read from the nonvolatile memory device 210 decreases, and the read speed of the storage device 200 is improved.

Also, the storage device 200 according to an embodiment of the disclosure may transmit a response including a marked bit to the host device 100 when the error correction of the physical address entry fails and when the miss count reaches the first threshold value TH1.

The marked bit transmitted when the error correction fails may notify the host device 100 that the physical address entries PAE stored in the host memory 130 are damaged or that the host memory controller 120 causes errors. The marked bit transmitted to the host device 100 when the miss count reaches the first threshold value TH1 may notify the host device 100 that the physical address entries PAE stored in the host memory 130 are old and are incorrect. The performance of the electronic device 10 may be improved by providing various information to the host device 100.

Figure 11:
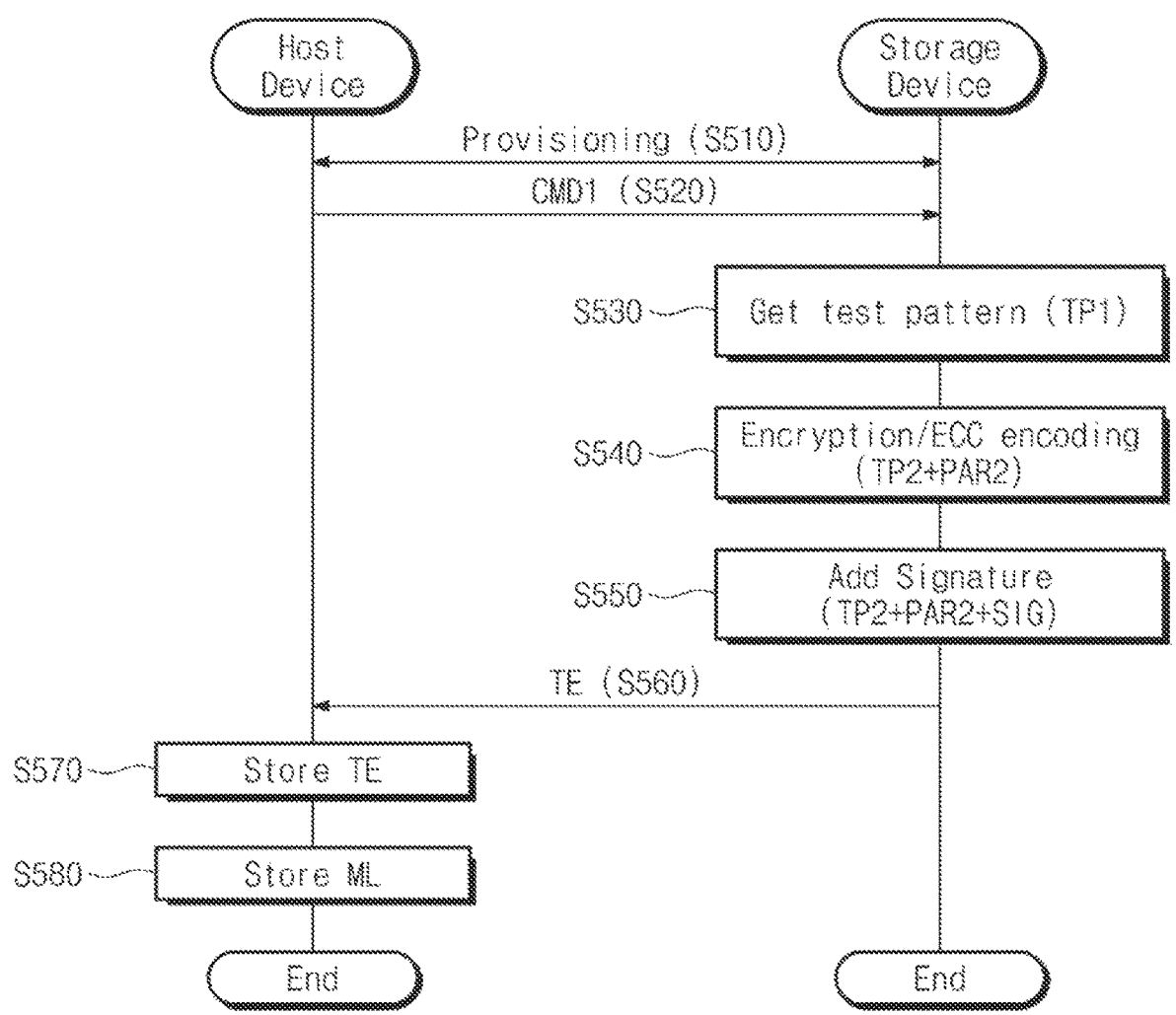
FIG. 11 illustrates an example in which a host device and a storage device upload a test pattern to test a host performance booster (HPB).

FIG. 11 illustrates an example in which the host device 100 and the storage device 200 upload a test pattern to test an HPB. Referring to FIGS. 1 and 11, in operation S510, the host device 100 and the storage device 200 may perform provisioning. In an embodiment, the HPB may be activated in the provisioning.

In operation S520, the host device 100 may transmit the first command CMD1 to the storage device 200. The first command CMD1 may refer to a command for requiring the upload of physical addresses. For example, the first command CMD1 may be the map data read command. For example, the host device 100 may include a range of physical addresses to be uploaded in the first command CMD1 in the form of logical addresses.

In operation S530, the storage device 200 may obtain test patterns. For example, the memory controller 220 may select at least some of a plurality of given test patterns to obtain first test patterns TP1. Alternatively, the memory controller 220 may obtain the first test patterns TP1 by reading given test patterns. Here, the test patterns TP1 may be one or more test patterns.

In operation S540, the memory controller 220 may perform encryption and error correction encoding. For example, the first test patterns TP1 may be transferred to the first encryption and decryption module 224 and the first error correction module 223. The first encryption and decryption module 224 and the first error correction module 223 may generate second test patterns TP2 and second parities PAR2 by performing encryption and error correction encoding on the first test patterns TP1. For example, the first test patterns TP1 may be sequentially transferred to the first encryption and decryption module 224 and the first error correction module 223, and the second test patterns TP2 and the second parities PAR2 generating by sequentially performing encryption and error correction encoding on the first test patterns TP1.

In operation S550, the CPU 225 may add signatures SIG. For example, the CPU 225 may generate test entries TE by adding the signatures SIG to the second test patterns TP2 and the second parities PAR2.

In operation S560, the memory controller 220 may transmit the test entries TE to the host device 100. In operation S570, the host device 100 may store the test entries TE. For example, the host device 100 may store the test entries TE in the first host memory area 131 of the host memory 130.

In operation S580, the host device 100 may store the map list ML. For example, the host device 100 may generate the map list ML and may store the map list ML in the second host memory area 132 of the host memory 130. The map list ML may include logical addresses to be transmitted to the storage device 200 by using the first command CMD1 and write pointers indicating locations of the first host memory area 131, at which the test entries TE corresponding to logical addresses are stored.

Figure 12:
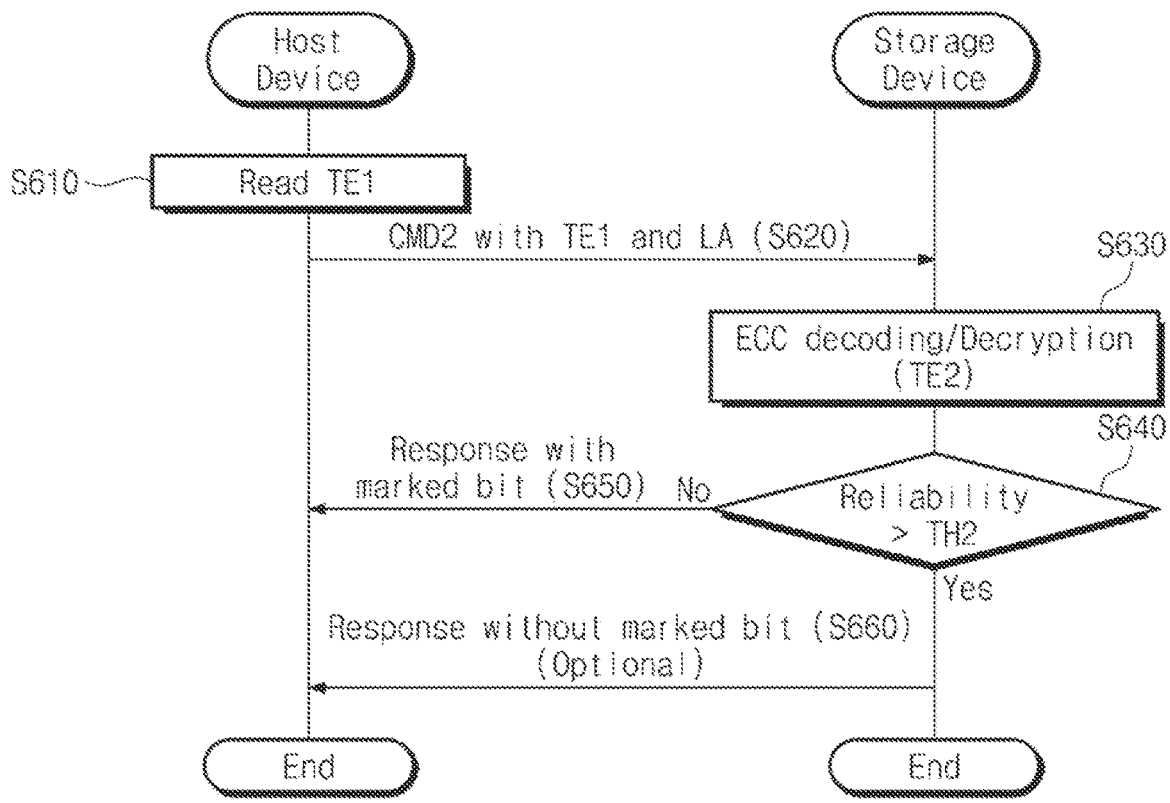
FIG. 12 illustrates an example in which a host device and a storage device read a test pattern to test an HPB.

FIG. 12 illustrates an example in which the host device 100 and the storage device 200 read a test pattern to test an HPB.

Referring to FIGS. 1 and 12, in operation S610, the host device 100 may read a first test entry TE1. For example, the host device 100 may read the first test entry TE1 corresponding to data to be read from the storage device 200 from the test entries TE of the first host memory area 131 of the host memory 130.

In operation S620, the host device 100 may transmit the second command CMD2 to the storage device 200 together with the first test entry TE1 and the logical address LA. The second command CMD2 may request to perform the read operation by using the first test entry TE1. For example, the second command CMD2 may be the HPB read command. Alternatively, the second command CMD2 may be an HPB test command. The logical address LA may be an arbitrary value or a logical address of data that the host device 100 intends to read.

In operation S630, the storage device 200 may perform error correction decoding and decryption. For example, a test pattern and a parity included in the first test entry TE1 received from the host device 100 may be transferred to the first error correction module 223 and the first encryption and decryption module 224. The first error correction module 223 and the first encryption and decryption module 224 may generate a test pattern by performing error correction decoding and decryption on the test pattern and the parity included in the first test entry TE1. For example, the test pattern and the parity may be sequentially transferred to the first error correction module 223 and the first encryption and decryption module 224, and the test pattern may be generated by sequentially performing error correction decoding and decryption on the test pattern and the parity included in the first test entry TE1.

In an embodiment, when the error correction decoding succeeds, the CPU 225 may verify validity of the first test entry TE1 by using the signature SIG included in the first test entry TE1.

In operation S640, the storage device 200 may determine that reliability is higher than a second threshold value TH2. For example, the memory controller 220 may evaluate the reliability to be lower as the number of errors corrected in the error correction decoding increases. The memory controller 220 may evaluate the reliability to be higher as the number of errors corrected in the error correction decoding decreases. For example, when the number of errors corrected in the error correction decoding is smaller than a threshold value, the memory controller 220 may determine that the reliability of the HPB is higher than the second threshold value TH2.

When the reliability is not higher than the second threshold value TH2, in operation S650, the storage device 200 may transmit a response including a marked bit to the host device 100. As the response including the marked bit is received, the host device 100 may deactivate the HPB.

When the reliability is higher than the second threshold value TH2, in operation S660, the storage device 200 may transmit a response, which does not include a marked bit, (e.g., a normal response) to the host device 100. Operation S660 may be optionally performed or may be skipped. When the response not including the marked bit is received or when the response is not received, the host device 100 may load the physical address entries PAE to the first host memory area 131 of the host memory 130 by performing the operations described with reference to FIGS. 2 and 3.

As described above, the second error correction module 227 and the second encryption and decryption module 228 associated with the nonvolatile memory device 210 may operate both when data are transmitted to the nonvolatile memory device 210 and when data are received from the nonvolatile memory device 210.

The first error correction module 223 and the first encryption and decryption module 224 associated with the host device 100 may selectively operate depending on data or a command. For example, error correction encoding and encryption of the first error correction module 223 and the first encryption and decryption module 224 may be performed only when the physical address entries PAE are uploaded to the host device 100. Error correction decoding and decryption of the first error correction module 223 and the first encryption and decryption module 224 may be performed only when the HPB read command is received.

Figure 13:
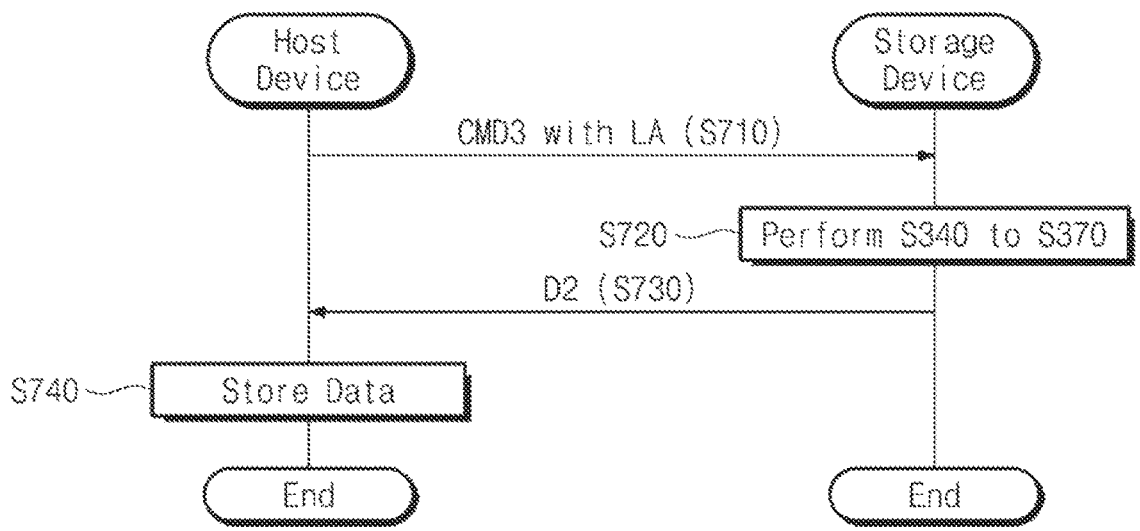
FIG. 13 illustrates a fourth example in which a host device and a storage device perform a read operation.

FIG. 13 illustrates an example in which the host device 100 and the storage device 200 perform a read operation based on a logical address.

Referring to FIGS. 1 and 13, in operation S710, the host device 100 may transmit a third command CMD3 to the storage device 200 together with the logical address LA. The third command CMD3 may request to perform the read operation by using the logical address LA. The logical address LA may be a logical address of data that the host device 100 intends to read.

In operation S720, the storage device 200 may read the first data D1 by performing operation S320 to operation S370. In operation S730, the storage device 200 may transmit the second data D2 to the host device 100. In operation S740, the host device 100 may store the second data D2 in the second host memory area 132 of the host memory 130.

Figure 14:
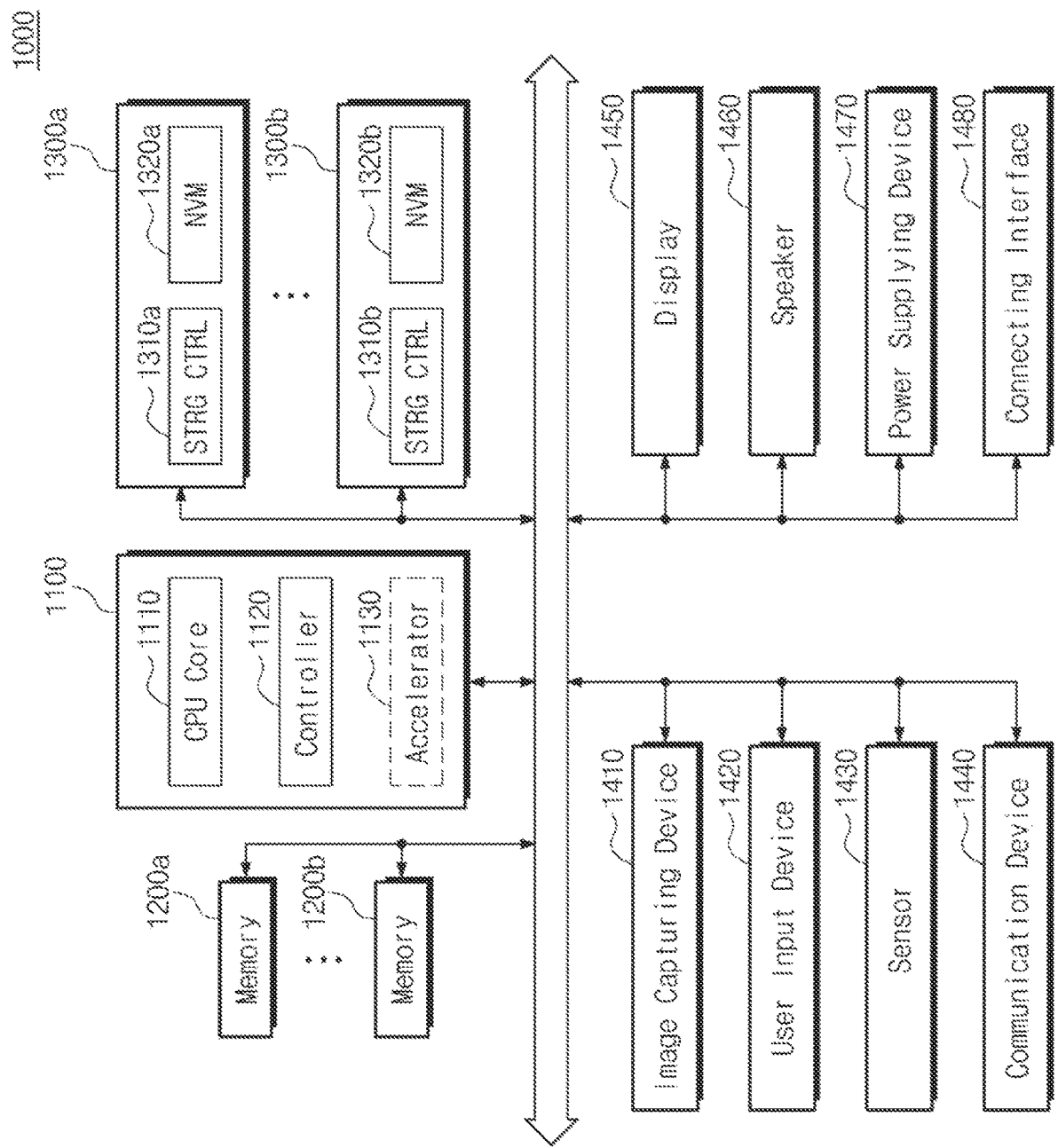
FIG. 14 is a diagram illustrating a system according to an embodiment of the disclosure.

FIG. 14 is a diagram of a system 1000 to which a storage device is applied, according to an embodiment. The system 1000 of FIG. 14 may basically be a mobile system, such as a portable communication terminal (e.g., a mobile phone), a smartphone, a tablet personal computer (PC), a wearable device, a healthcare device, or an Internet of things (IOT) device. However, the system 1000 of FIG. 14 is not necessarily limited to the mobile system and may be a PC, a laptop computer, a server, a media player, or an automotive device (e.g., a navigation device).

Referring to FIG. 14, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000, more specifically, operations of other components included in the system 1000. The main processor 1100 may be implemented as a general-purpose processor, a dedicated processor, or an application processor.

The main processor 1100 may include at least one CPU core 1110 and further include a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as an artificial intelligence (AI) data operation. The accelerator 1130 may include a graphics processing unit (GPU), a neural processing unit (NPU) and/or a data processing unit (DPU) and be implemented as a chip that is physically separate from the other components of the main processor 1100.

The memories 1200a and 1200b may be used as main memory devices of the system 1000. Although each of the memories 1200a and 1200b may include a volatile memory, such as static random access memory (SRAM) and/or dynamic RAM (DRAM), each of the memories 1200a and 1200b may include non-volatile memory, such as a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and have larger storage capacity than the memories 1200a and 1200b. The storage devices 1300a and 1300b may respectively include storage controllers (STRG CTRL) 1310a and 1310b and NVM (Non-Volatile Memory)s 1320a and 1320b configured to store data via the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as PRAM and/or RRAM.

The storage devices 1300a and 1300b may be physically separated from the main processor 1100 and included in the system 1000 or implemented in the same package as the main processor 1100. In addition, the storage devices 1300a and 1300b may have types of solid-state devices (SSDs) or memory cards and be removably combined with other components of the system 1000 through an interface, such as the connecting interface 1480 that will be described below. The storage devices 1300a and 1300b may be devices to which a standard protocol, such as a universal flash storage (UFS), an embedded multi-media card (eMMC), or a non-volatile memory express (NVMe), is applied, without being limited thereto.

The image capturing device 1410 may capture still images or moving images. The image capturing device 1410 may include a camera, a camcorder, and/or a webcam.

The user input device 1420 may receive various types of data input by a user of the system 1000 and include a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery (not shown) embedded in the system 1000 and/or an external power source, and supply the converted power to each of components of the system 1000.

The connecting interface 1480 may provide connection between the system 1000 and an external device, which is connected to the system 1000 and capable of transmitting and receiving data to and from the system 1000. The connecting interface 1480 may be implemented by using various interface schemes, such as advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

In an embodiment, the storage device 200 described with reference to FIGS. 1 to 13 may be implemented with the storage devices 1300a and 1300b. For example, the storage devices 1300a and 1300b may perform the HPB and may perform error correction on a physical address entry.

In the above embodiments, components according to the disclosure are described by using the terms "first", "second", "third", etc. However, the terms "first", "second", "third", etc. may be used to distinguish components from each other and do not limit the disclosure. For example, the terms "first", "second", "third", etc. do not involve an order or a numerical meaning of any form.

In the above embodiments, components according to embodiments of the disclosure are referenced by using blocks. The blocks may be implemented with various hardware devices, such as an integrated circuit, an application specific IC (ASIC), a field programmable gate array (FPGA), and a complex programmable logic device (CPLD), firmware driven in hardware devices, software such as an application, or a combination of a hardware device and software. Also, the blocks may include circuits implemented with semiconductor elements in an integrated circuit, or circuits enrolled as an intellectual property (IP).

According to embodiments of the disclosure, a storage device may upload physical addresses to a host device and may access a nonvolatile memory device based on a physical address received from the host device. Also, the storage device may perform error correction on the physical address received from the host device by adding error correction parities to the physical addresses uploaded to the host device. Accordingly, the number of times (or frequency) that the storage device reads map data from the nonvolatile memory device decreases, and an operation speed of the storage device is improved.

While the disclosure has been described with reference to embodiments thereof, it will be apparent to those of ordinary skill in the art that various changes and modifications may be made thereto without departing from the spirit and scope of the disclosure as set forth in the following claims.

What is claimed is:

1. A storage device comprising:
a nonvolatile memory device comprising a first area and a second area; and
a controller configured to:
receive a first command from a host device, the first command comprising a first entry including physical address information and parity information,
perform first error correction decoding based on the physical address information in the first command and the parity information in the first command;
based on a success of the first error correction decoding:
generate a physical address based on the physical address information,
read first data from the second area of the nonvolatile memory device based on the physical address, and
output the first data to the host device, and based on a failure of the first error correction decoding:
read first map data from the first area in the nonvolatile memory device,
translate a logical address in the first command into the physical address based on the first map data,
read the first data from the second area of the nonvolatile memory device based on the physical address, and
output the first data to the host device.

2. The storage device of claim 1, wherein the controller is further configured to read the first data from the second area in the nonvolatile memory device by performing second error correction decoding on second data output from the nonvolatile memory device.

3. The storage device of claim 2, wherein a number of bits of a first parity associated with the first error correction decoding is less than a number of bits of a second parity associated with the second error correction decoding.

4. The storage device of claim 2, wherein the controller is further configured to read the first map data from the first area in the nonvolatile memory device by performing the second error correction decoding on second map data output from the nonvolatile memory device.

5. The storage device of claim 1, wherein, based on a second command received from the host device, the controller is configured to:
read first physical addresses from the first area of the nonvolatile memory device;
generate second physical addresses and first parities by performing first error correction encoding on the first physical addresses; and
transmit physical address entries comprising the second physical addresses and the first parities.

6. The storage device of claim 5, wherein the physical address entries further comprise signatures.

7. The storage device of claim 1, wherein, based on the failure of the first error correction decoding, the controller is further configured to transmit, to the host, a response comprising a first bit marked to indicate that the failure of first error correction decoding.

8. The storage device of claim 1, wherein, based on the success of the first error correction decoding and a hit in a first map table corresponding to the physical address, the controller is further configured to read the first data by using the physical address,
wherein, based on the success of the first error correction decoding succeeds and a miss in the first map table corresponding to the physical address, the controller is further configured to:
read the first map data from the first area in the nonvolatile memory device;
translate the logical address into the physical address based on the first map data; and
read the first data based on the physical address.

9. The storage device of claim 8, wherein, based on the first map data being updated, the first map table corresponding to the physical address misses, and
wherein, based on the first map data being maintained, the first map table corresponding to the physical address hits.

10. The storage device of claim 8, wherein, based on the miss in the first map table corresponding to the physical address, the controller is further configured to increase a miss count.

11. The storage device of claim 10, wherein, based on the miss count reaching a threshold value, the controller is further configured to transmit, to the host device, a response comprising a second bit marked to indicate that the miss count has reached the threshold value.

12. The storage device of claim 1, wherein, based on a second command received from the host device, the controller is further configured to:
perform error correction encoding on a first test pattern to generate a second test pattern and a first parity; and
transmit a first test entry comprising the second test pattern, the first parity, and a signature to the host device.

13. The storage device of claim 12, wherein, based on a third command received from the host device comprising a second test entry, the controller is configured to:
perform the first error correction decoding on the second test entry in the third command; and
evaluate reliability of the second test entry based on a result of the first error correction decoding performed on the second test entry.

14. The storage device of claim 13, wherein, based on the reliability of the second test entry being equal to or lower than a threshold value, the controller is further configured to transmit, to the host device, a response comprising a third bit marked to indicate that reliability of the second test entry is lower than a threshold value.

15. The storage device of claim 13, wherein, based on the reliability of the second test entry being higher than a threshold value, the controller is further configured to transmit a normal response to the host device or skip a transfer of a response regarding the reliability of the second test entry.

16. The storage device of claim 1, wherein, based on a second command received from the host device, the controller is configured to:
    read second map data from the first area in the nonvolatile memory device;
    translate a second logical address in the second command into a second physical address by using the second map data;
    read second data from the second area in the nonvolatile memory device using based on the second physical address; and
    transmit the second data to the host device.

17. A storage device comprising:
    a nonvolatile memory device comprising a first area and a second area; and
    a controller configured to:
        receive a first command from a host device,
        read first physical addresses from the first area in the nonvolatile memory device based on the first command,
        obtain physical address entries by performing the first error correction encoding on the first physical addresses, each of the first physical address entries comprising physical information and parity information respectively corresponding to one of the first physical addresses, and
        transmit physical address entries to the host device
    wherein, based on a second command comprising a physical address entry received from the host device, the controller is configured to:
        generate a physical address by performing first error correction decoding on the physical address entry;
        read first data from the second area in the nonvolatile memory device based on the physical address;
        generate second data by performing second error correction decoding on the first data; and
        output the second data to the host device,
    wherein the controller is further configured to:
        perform first encryption on the first physical addresses to obtain the physical address entries,
        perform first decryption on the physical address entry to generate the physical address, and
        perform second decryption on the first data to generate the second data,
        wherein a data unit by which the first decryption is performed is different from a data unit by which the second decryption is performed.

18. A storage device comprising:
    a nonvolatile memory device comprising a first area and a second area; and
    a controller configured to:
        receive a first command from a host device,
        read first physical addresses and first parities from the first area in the nonvolatile memory device,
        generate second physical addresses by performing first error correction decoding and first decryption on the first physical addresses and the first parities,
        generate third physical addresses and second parities by performing first encryption and first error correction encoding on the second physical addresses,
        transmit physical address entries comprising the third physical addresses and the second parities to the host device,
        receive a second command comprising a physical address entry, and
        perform second error correction decoding on the physical address entry in the second command,
        based on a success of the second error correction decoding:
        generate a fourth physical address by performing second error correction decoding and second decryption on the physical address entry in the second command;
        read first data and a third parity from the second area in the nonvolatile memory device based on the fourth physical address;
        generate second data by performing third error correction decoding and third decryption on the first data and the third parity; and
        output the second data to the host device, and based on a failure of the second error correction decoding:
        read first map data and a fourth parity from the first area in the nonvolatile memory device;
        generate second map data by performing fourth error correction decoding and fourth decryption on the first map data and the fourth parity;
        translate a logical address included in the second command into the fourth physical address based on the second map data;
        read the first data and the third parity from the second area in the nonvolatile memory device based on the fourth physical address;
        generate the second data by performing the third error correction decoding and the third decryption on the first data and the third parity; and
    output the second data to the host device.

* * * * *